No. 745,620. PATENTED DEC. 1, 1903.
W. A. & O. M. HUFFMAN.
WASHING APPARATUS.
APPLICATION FILED APR. 22, 1903.
NO MODEL.
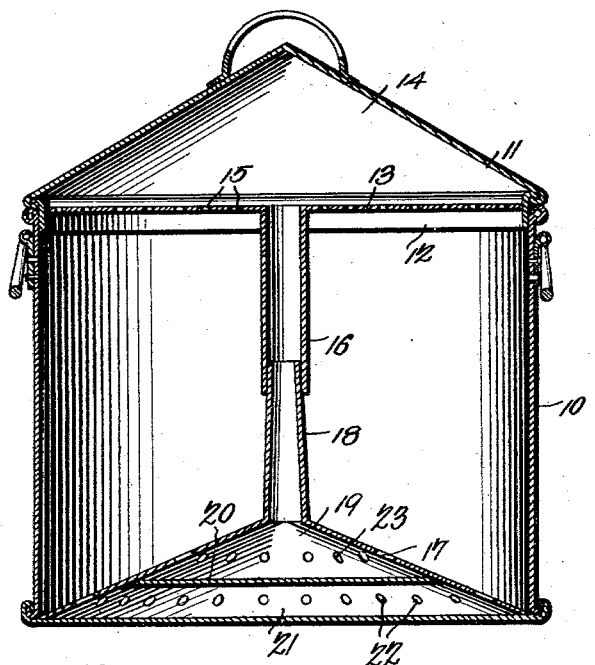
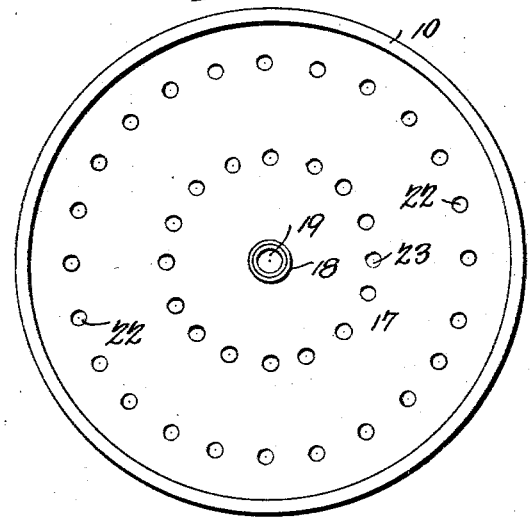
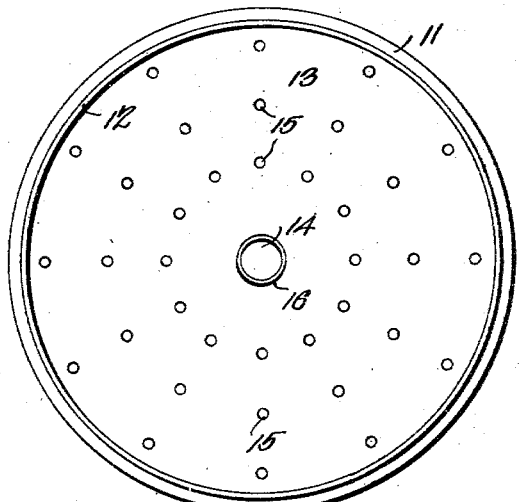

No. 745,620. Patented December 1, 1903.

UNITED STATES PATENT OFFICE.

WILIAM ANTHONY HUFFMAN AND OSCAR MOSES HUFFMAN, OF ECTOR, TEXAS.

WASHING APPARATUS.

SPECIFICATION forming part of Letters Patent No. 745,620, dated December 1, 1903.

Application filed April 22, 1903. Serial No. 153,825. (No model.)

*To all whom it may concern:*

Be it known that we, WILIAM ANTHONY HUFFMAN and OSCAR MOSES HUFFMAN, citizens of the United States, residing at Ector, in the county of Fannin and State of Texas, have invented a new and useful Washing Apparatus, of which the following is a specification.

This invention relates to devices for washing clothes, more particularly to that class of devices wherein the hot water and steam are caused to automatically circulate through the clothes, and has for its object to simplify and improve devices of this character and cheapen the construction and increase the efficiency; and the invention consists in certain novel features of the construction, as hereinafter shown and described, and specified in the claim.

In the drawings illustrative of the invention, in which corresponding parts are denoted by like designating characters, Figure 1 is a sectional side elevation. Fig. 2 is a plan view with the cover removed. Fig. 3 is a bottom plan view of the cover member.

The improved device consists of a tub or receptacle 10, of sheet metal, of sufficient strength to withstand the strains to which it will be subjected and of any suitable size and adapted to be placed upon a stove or other heating medium. The receptacle is provided with a cover 11, preferably conical and rising above the receptacle, as shown. The cover will be provided with a depending supporting-rim 12 of the usual form, and will also be provided at or near its bottom with a transverse perforated diaphragm 13, having a depending tubular member 16 and forming a compartment 14 within the cover above the receptacle. In the bottom of the receptacle a dome-shaped false bottom 17 is supported and preferably made conical in shape, with its edges disposed in close proximity to the sides of the receptacle and having a tubular spout 18 extending upwardly and telescopically engaging the tubular member 16 of the top, whereby the compartment 14 and the compartment or chamber 19, formed below the false bottom 17, are united. Within the chamber formed by the false bottom is disposed at ransverse imperforate diaphragm 20, spaced from the bottom of the receptacle to form a relatively shallow compartment 21 at the bottom of the vessel 10. The false bottom 17 is provided with spaced apertures 22, leading into the compartment 21, and similar apertures 23, leading into the compartment 19; but the diaphragm 20 is without perforations, as above noted. When thus constructed and assembled, with the clothes and water disposed in the receptacle, together with the necessary soap or other cleansing compound, and heat applied, as fast as steam is generated the water will flow rapidly through the apertures 23 and tubular sections 16 18 into the compartment 14 and return through the perforations 15 and thence continuously circulate through the clothes, as will be obvious, and thoroughly cleanse them, the imperforate diaphragm 20 forming a shallow water-compartment at the bottom of the receptacle directly over the heating medium to provide for the maximum generation of steam with the minimum of heat, which is an important feature when an expensive fuel is used.

The cover member 11 and the receptacle 10 will be provided with the usual handles, whereby the device may be easily handled.

The diaphragms 13 and 20 may be detachably connected to cover 11 and bottom 17, so that they may be removed when the interior of the cover and casing require cleansing.

The whole device is very simple in construction, easily operated, and will most effectually perform the work required.

What we claim is—

A washer comprising a receptacle having an upwardly-extending cone-shaped cover member provided with a transversely-arranged perforated diaphragm forming a compartment within said cover, said diaphragm having a tubular member depending from the center thereof, a cone-shaped perforated false bottom disposed within said receptacle with a tubular member extending upwardly from the apex thereof and telescopically engaging the tubular member of said cover, and an imperforate diaphragm arranged transversely within said cone-shaped false bottom at an intermediate point to form a chamber above and one below it, said false bottom having perforations therein beneath said diaphragm.

In testimony that we claim the foregoing as our own we have hereto affixed our signatures in the presence of two witnesses.

WILIAM ANTHONY HUFFMAN.
OSCAR MOSES HUFFMAN.

Witnesses:
M. L. GUNN,
W. P. KANTZ.